United States Patent
Wirth et al.

(10) Patent No.: US 12,275,463 B2
(45) Date of Patent: Apr. 15, 2025

(54) STEERING TRANSMISSION FOR ELECTROMECHANICAL STEERING SYSTEM FOR A VEHICLE AND ELECTROMECHANICAL STEERING SYSTEM FOR A VEHICLE

(71) Applicant: KNORR-BREMSE SYSTEME FÜR NUTZFAHRZEUGE GMBH, Munich (DE)

(72) Inventors: Christian Wirth, Moosinning (DE); Franz-Thomas Mitterer, Osterhofen (DE); Janos Toth, Kecskemet (HU); Sven Krueger, Munich (DE); Ahmed Saleme, Wuppertal (DE); Huba Nemeth, Budapest (HU); Stephan Krinke, Muelheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 218 days.

(21) Appl. No.: 17/768,720

(22) PCT Filed: Oct. 14, 2020

(86) PCT No.: PCT/EP2020/078842
§ 371 (c)(1),
(2) Date: Apr. 13, 2022

(87) PCT Pub. No.: WO2021/074190
PCT Pub. Date: Apr. 22, 2021

(65) Prior Publication Data
US 2024/0132144 A1 Apr. 25, 2024
US 2024/0227918 A9 Jul. 11, 2024

(30) Foreign Application Priority Data

Oct. 16, 2019 (DE) .................... 10 2019 127 965.8

(51) Int. Cl.
*B62D 5/04* (2006.01)
(52) U.S. Cl.
CPC ......... *B62D 5/0412* (2013.01); *B62D 5/0421* (2013.01)
(58) Field of Classification Search
CPC ........................... B62D 5/0412; B62D 5/0421
See application file for complete search history.

(56) References Cited

U.S. PATENT DOCUMENTS 12,139,209 B2 * 11/2024 Nemeth ............... B62D 5/0415
2017/0282964 A1 10/2017 Sekikawa
(Continued)

FOREIGN PATENT DOCUMENTS

CN 201376593 Y 1/2010
CN 103935398 A 7/2014
(Continued)

OTHER PUBLICATIONS

International Search Report (PCT/ISA/210) issued in PCT Application No. PCT/EP2020/078842 dated Jan. 19, 2021 with English translation (five (5) pages).
(Continued)

*Primary Examiner* — Kevin Hurley
(74) *Attorney, Agent, or Firm* — Crowell & Moring LLP

(57) ABSTRACT

A steering gear for an electromechanical steering system for a vehicle includes an input shaft that can be coupled or connected to a steering column of the steering system, a segment shaft that can be coupled or connected to a steering column lever of the steering system, an angular gear, a servo gear, and an electric motor for driving the servo gear. The angular gear is designed as a bevel gear. The input shaft and the electric motor are connected to the servo gear. The servo gear is connected to the angular gear. The angular gear is connected to the segment shaft. The angular gear is formed
(Continued)

to transmit torque from the servo gear to the segment shaft via two transmission paths.

11 Claims, 5 Drawing Sheets

(56) References Cited

U.S. PATENT DOCUMENTS

| | | |
|---|---|---|
| 2018/0244303 A1 | 8/2018 | Wilske et al. |
| 2019/0144092 A1 | 5/2019 | Cho et al. |
| 2021/0114658 A1 | 4/2021 | Sprinzl |

FOREIGN PATENT DOCUMENTS

| | | | | |
|---|---|---|---|---|
| CN | 107128358 A | | 9/2017 | |
| CN | 107176203 A | | 9/2017 | |
| CN | 107235072 A | | 10/2017 | |
| CN | 107921993 A | | 4/2018 | |
| CN | 110114258 A | | 8/2019 | |
| DE | 1 913 011 A1 | | 9/1970 | |
| DE | 102010053581 A1 | * | 6/2012 | ............... B62D 5/04 |
| DE | 10 2011 051 529 A1 | | 1/2013 | |
| DE | 10 2015 217 045 A1 | | 3/2017 | |
| DE | 102015217046 A1 | * | 3/2017 | |
| DE | 10 2016 212 818 A1 | | 1/2018 | |
| GB | 1 296 666 A | | 11/1972 | |
| JP | 50-5793 A | | 1/1975 | |
| JP | 7-19062 U | | 4/1995 | |
| JP | 2007-99144 A | | 4/2007 | |
| JP | 2012-61938 A | | 3/2012 | |
| JP | 2012061938 A | * | 3/2012 | ............. B63H 23/04 |
| JP | 2017-213939 A | | 12/2017 | |
| WO | WO 2009/100850 A1 | | 8/2009 | |

OTHER PUBLICATIONS

Japanese-language Written Opinion (PCT/ISA/237) issued in PCT Application No. PCT/EP2020/078842 dated Jan. 19, 2021 (five (5) pages).

German-language Office Action issued in German Application No. 10 2019 127 965.8 dated Aug. 10, 2020 (six (6) pages).

International Preliminary Report on Patentability (PCT/IB/326 & PCT/IB/373) issued in PCT Application No. PCT/EP2020/078842 dated Apr. 28, 2022, including English translation of document C2 (German-language Written Opinion (PCT/ISA/237), filed on Apr. 13, 2022 (seven (7) pages).

Japanese-language Office Action issued in Japanese Application No. 2022-523019 dated May 30, 2023 with English translation (11 pages).

Chinese-language Office Action issued in Chinese Application No. 202080073421.0 dated Mar. 28, 2023 with English translation (11 pages).

* cited by examiner

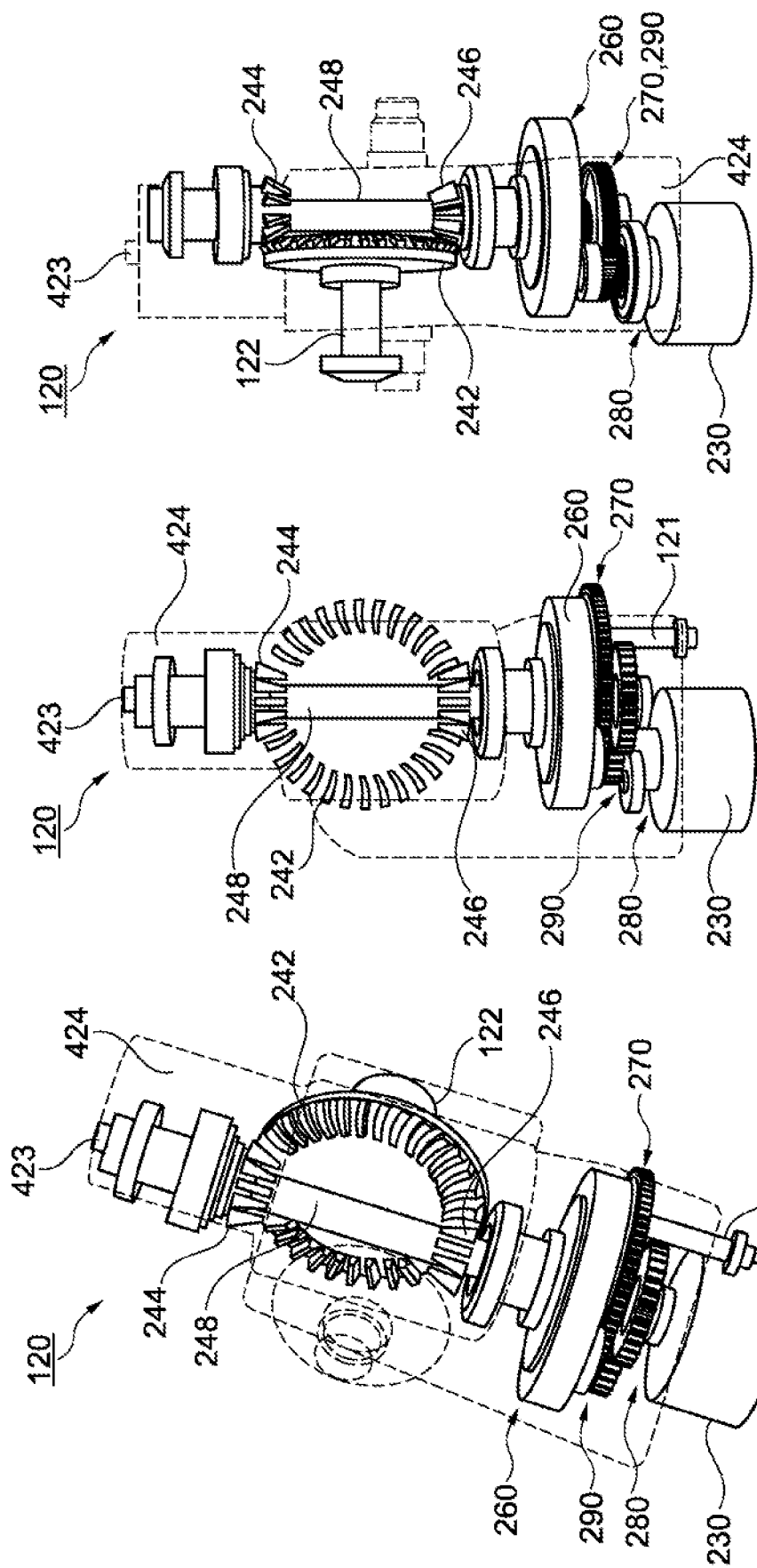

STEERING TRANSMISSION FOR ELECTROMECHANICAL STEERING SYSTEM FOR A VEHICLE AND ELECTROMECHANICAL STEERING SYSTEM FOR A VEHICLE

BACKGROUND AND SUMMARY

The present invention relates to a steering gear for an electromechanical steering system for a vehicle and to an electromechanical steering system for a vehicle, in particular for a utility vehicle.

A power steering system as part of a steering system of a utility (commercial) vehicle may generally be implemented as a hydraulic system. Hydraulic systems may be disadvantageous relative to energy efficiency, wherein a high volumetric flow has to be pumped through the steering system at all times in order to provide a steering force. Moreover, functional developments, in addition to the actual steering function, such as for example driver assist systems, are expensive to implement. Moreover, lines which have to be installed, filled and tested during the assembly of a vehicle may generally be required between a steering pump and a steering gear, due to the separate installation locations thereof.

Against this background, it is the object of the present invention to provide an improved steering gear for an electromechanical steering system for a vehicle and an improved electromechanical steering system for a vehicle.

This object is achieved by a steering gear for an electromechanical steering system for a vehicle and by an electromechanical steering system for a vehicle according to the independent claims.

According to embodiments, an angular gear which is designed as a bevel gear for an electric power steering system with a planetary servo gear may be provided as a steering gear, in particular, for a power steering system of a steering system for a utility vehicle. Such a power steering gear for a utility vehicle may be configured in order to transfer, for example, a rotational movement of the steering gear into a pivoting movement of an output shaft by means of a bevel gear. The bevel gear may be designed such that an input torque of such a support gear is divided into two distribution paths which apply a torque to the bevel gear which may be connected to an output shaft or segment shaft of the steering gear.

Advantageously, according to embodiments a robust, low-maintenance, reliable and compact steering gear or electromechanical steering gear may be provided. To this end, a steering support may be increased, in particular, by two planetary servo gears which are connected in series and which are driven by an electric motor. For example, at least one spur gear may be arranged between the two planetary servo gears, whereby a connection may also be made to the steering column or to the steering wheel and a steering wheel input may be applied to the servo gear unit. In particular, in a last gear stage the steering input and a supporting torque may be applied to the bevel gear which is able to transfer the rotational movement into a pivoting movement of a steering column lever which may be attached to an output shaft or segment shaft of the steering gear. The bevel gear may be designed such that an input torque of such a support gear is distributed to two distribution paths which apply the torque to a bevel wheel of the bevel gear which is connected to the output shaft or segment shaft.

A steering gear for an electromechanical steering system for a vehicle comprises an input shaft that can be coupled or connected to a steering column of the steering system, a segment shaft that can be coupled or connected to a steering column lever of the steering system, an angular gear, a servo gear, and an electric motor for driving the servo gear, wherein the angular gear is designed as a bevel gear, wherein the input shaft and the electric motor are connected to the servo gear, wherein the servo gear is connected to the angular gear, wherein the angular gear is connected to the segment shaft, wherein the angular gear is formed to transmit torque from the servo gear to the segment shaft via two transmission paths.

The vehicle may be a motor vehicle for transporting people and, additionally or alternatively, goods, in particular a utility vehicle, for example a truck or the like. Each of the gears may also be denoted as a gear unit. If two components are engaged, connected or coupled to one another, a positive connection and additionally or alternatively a non-positive connection may be present between the components.

In particular, the angular gear which is designed as a bevel gear may have a bevel wheel, a first pinion and a second pinon. In this case, the pinions may be engaged with the bevel wheel. The first pinion may be connected to a first component of the servo gear. The second pinion may be connected to a second component of the servo gear. The first pinon may be part of a first of the transmission paths. The second pinion may be part of a second of the transmission paths. In this case, the pinions may be engaged with the bevel wheel at opposing ends of a diameter of the bevel wheel. Such an embodiment provides the advantage that a reliable and robust torque transmission to the segment shaft may be achieved.

According to one embodiment, the servo gear may have a first planetary gear, a first spur gear, a second planetary gear and a second spur gear. In this case, the input shaft may be connected via the first spur gear to the first planetary gear. The electric motor may be connected via the second planetary gear and the second spur gear to the first planetary gear. The first planetary gear may be connected to the angular gear. Thus an advantageous transmission ratio and an advantageous torque distribution and torque transmission may be implemented.

In this case, the first spur gear may be connected between the second spur gear and the first planetary gear. In this case, the second spur gear may be connected between the second planetary gear and the first spur gear. Such an embodiment provides the advantage that a simple design and a high level of efficiency may be achieved by the spur gear.

In this case, the first planetary gear may also have a first ring gear, a first sun wheel and at least one first planet wheel. In this case, the first sun wheel may be connected to the spur gears. The at least one first planet wheel may be connected to a first of two pinions of the angular gear which is designed as a bevel gear. The first ring gear may be connected to a second of the two pinions of the angular gear which is designed as a bevel gear. In this manner, a reliable combination of torques from the input shaft and from the electric motor and an advantageous torque distribution to the two transmission paths may be achieved.

Moreover, in this case the second planetary gear may have a second ring gear, a second sun wheel and at least one second planet wheel. In this case, the second ring gear may be fixed to a housing of the steering gear. The second sun wheel may be connected to the electric motor. The at least one second planet wheel may be connected to the second spur gear. Such an embodiment provides the advantage that a torque of the electric motor may be increased by an advantageous transmission ratio.

In other words, for transmitting the torque from the input shaft and from the electric motor to the angular gear, the servo gear may have a spur gear stage and a planetary gear stage. Such an embodiment provides the advantage that a simple construction, an advantageous transmission ratio and a high level of efficiency may be implemented.

In this case, the electric motor may be connected via a further planetary gear of the servo gear to the spur gear stage. Such an embodiment provides the advantage that a torque of the electric motor may be reliably increased.

According to one embodiment, for transmitting the torque from the input shaft and from the electric motor to the angular gear, the servo gear may have a belt drive gear stage and a planetary gear stage. The belt drive gear stage may also be denoted as a belt gear stage. Such an embodiment provides the advantage that it is possible to implement a cost-effective and low-maintenance torque transmission.

In particular, the first spur gear may be designed as belt gear, chain gear, worm gear, harmonic gear or eccentric gear. Additionally or alternatively, the second planetary gear may be designed as a belt gear, chain gear, worm gear, harmonic gear or eccentric gear. Additionally or alternatively, the second spur gear may be designed as a belt gear, chain gear, worm gear, harmonic gear or eccentric gear. This results in many different embodiments or many different uses of gear types and gear combinations.

An electromechanical steering system for a vehicle has a steering column and a steering column lever, wherein the electromechanical steering system has an embodiment of the aforementioned steering gear, wherein the steering column and the steering column lever are connected together by means of the steering gear.

An embodiment of the aforementioned steering gear may be advantageously used or utilized in combination with the electromechanical steering system, in order to apply a steering torque which represents a torque of a steering input on a steering wheel and a supporting torque which represents a torque provided by the electric motor and the servo gear, onto the segment shaft via the angular gear. The electromechanical steering system may be denoted as an electromechanical power steering system or as a power steering system with an electromechanical drive.

Exemplary embodiments of the approach set forth herein are described in more detail in the following description with reference to the figures.

BRIEF DESCRIPTION OF THE DRAWINGS

FIG. 4 is a schematic view of the steering gear of FIG. 2 or FIG. 3;

FIG. 5 is a schematic view of the steering gear of FIG. 2, FIG. 3 or FIG. 4;

FIG. 6 is a schematic view of the steering gear of FIG. 2, FIG. 3, FIG. 4 or FIG. 5;

DETAILED DESCRIPTION OF THE DRAWINGS

Figure 1:
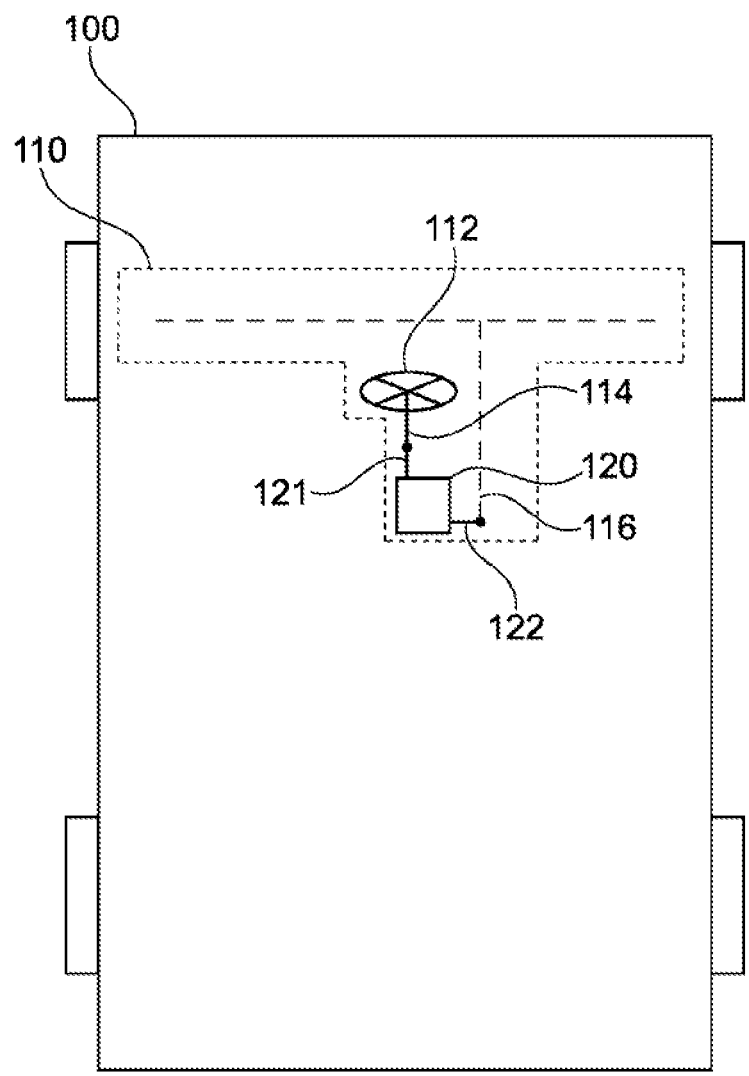
FIG. 1 is a schematic view of a vehicle with an electromechanical steering system according to an exemplary embodiment.

FIG. 1 shows a schematic view of a vehicle 100 with an electromechanical steering system 110 according to an exemplary embodiment. The vehicle 100 is a motor vehicle, in particular a utility (commercial) vehicle, such as for example a truck or the like. The steering system 110 has a steering column 114 and a steering column lever 116. The steering column 114 is connected to a steering wheel 112. The steering wheel 112 may also be part of the steering system 110. The steering column lever 116 is coupled to steerable wheels via suitable devices, by way of example an axle of the vehicle 100. Moreover, the steering system 110 has a steering gear 120. The steering gear 120 is designed as an electromechanical steering gear or with an electromechanical drive. The steering column 114 and the steering column lever 116 are connected together by means of the steering gear 120 or via the steering gear 120. In this case, an input shaft 121 and a segment shaft 122 of the steering gear 120 are also shown in FIG. 1. The input shaft 121 is connected to the steering column 114. The segment shaft 122 is connected to the steering column lever 116. Further detail is provided relative to the steering gear 120 with reference to the following figures.

Figure 2:
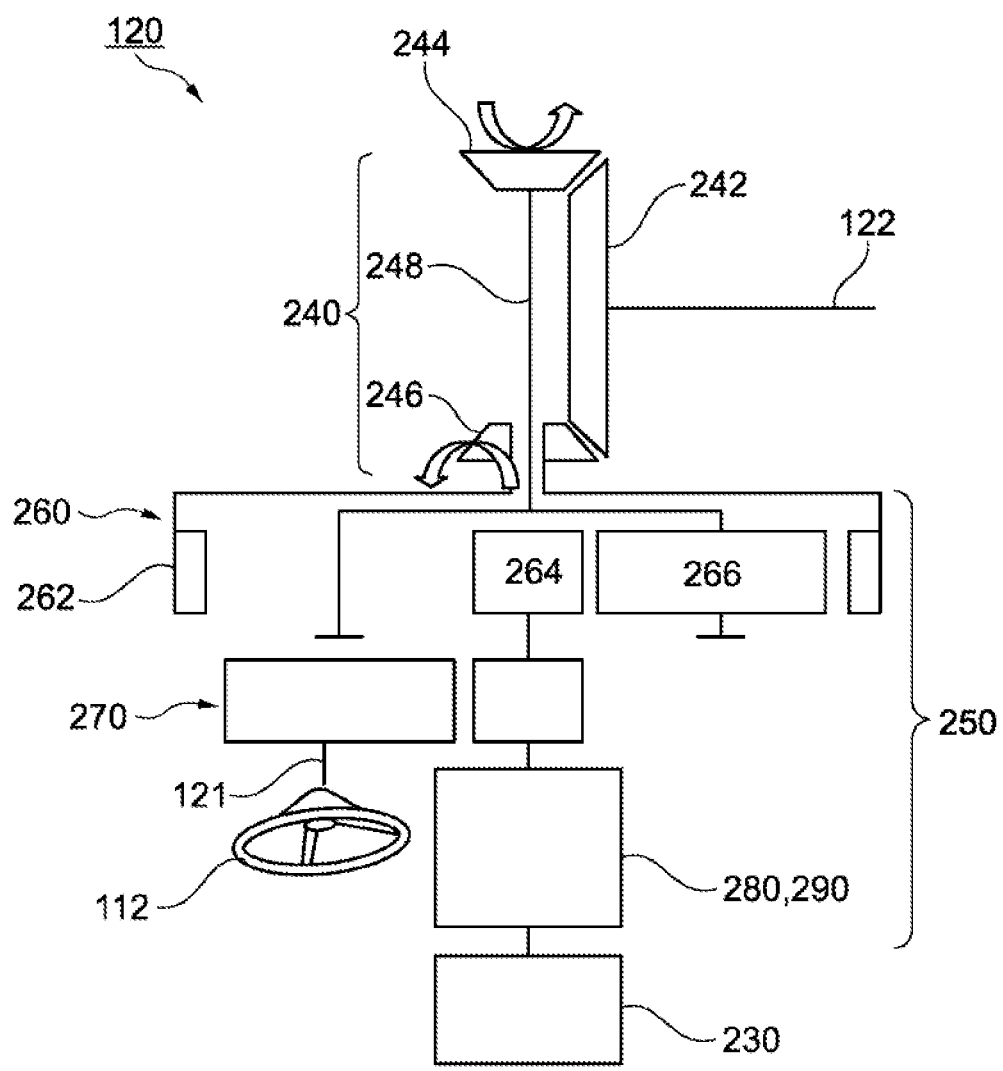
FIG. 2 is a schematic view of a steering gear according to an exemplary embodiment.

FIG. 2 shows a schematic view of a steering gear 120 according to an exemplary embodiment. The steering gear 120 corresponds or is similar to the steering gear of FIG. 1. Thus the steering gear 120 is provided for an electromechanical steering system for a vehicle. The steering gear 120 comprises the input shaft 121 which can be coupled or connected to the steering column of the steering system, the segment shaft 122 which can be coupled or connected to the steering column lever of the steering system, an angular gear 240, a servo gear 250 and an electric motor 230 for driving the servo gear 250 and thus also the angular gear 240. Moreover, for illustrative purposes the steering wheel 112 of the steering system is also shown in FIG. 2 as being connected to the input shaft 121.

The angular gear 240 is designed as a bevel gear. The input shaft 121 and the electric motor 230 are connected to the servo gear 250. The servo gear 250 is connected to the angular gear 240. The angular gear 240 is connected to the segment shaft 122. The angular gear 240 is designed to transmit a torque from the servo gear 250 via two transmission paths to the segment shaft 122.

The angular gear 240 which is designed as a bevel gear has a bevel wheel 242, a first pinion 244 and a second pinion 246. The first pinion 244 and the second pinion 246 are rotatably mounted about a common rotational axis which extends along an intermediate axle 248. The first pinon 244 is attached to the intermediate axle 248. The pinions 244 and 246 are engaged with the bevel wheel 242. A rotational axis of the bevel wheel 242 extends at right angles or orthogonally relative to the intermediate axle 248. The bevel wheel 242 is connected to the segment shaft 122. The first pinion 244 is part of a first of the transmission paths. The second pinion 246 is part of a second of the transmission paths.

The servo gear 250 has a first planetary gear 260, a first spur gear 270, a second planetary gear 280 and a second spur gear 290. The input shaft 121 is connected via the first spur gear 270 to the first planetary gear 260. The electric motor 230 is connected via the second planetary gear 280 and the second spur gear 290 to the first planetary gear 260. The first planetary gear 260 is connected to the angular gear 240.

The first planetary gear 260 has a first ring gear 262, a first sun wheel 264 and at least one first planet wheel 266. The first sun wheel 264 is connected to the spur gears 270 and 290, more specifically directly to the first spur gear 270. The at least one first planet wheel 266 is connected to the first pinion 244 of the angular gear 240. Thus the first pinion 244 is connected to the at least one first planet wheel 266 as a first component of the servo gear 250. The first ring gear 262 is connected to the second pinion 246 of the angular gear 240. Thus the second pinion 246 is connected to the first ring gear 262 as a second component of the servo gear 250.

By way of example, the electric motor 230 has a torque of 20 Newton meters, the second planetary gear 280 and the second spur gear 290 have an efficiency of 97 percent, the first spur gear 270 has a transmission ratio of approximately 0.50 and an efficiency of 99 percent, the first planetary gear 260 has a transmission ratio of approximately −6 and an efficiency of approximately 97.5 percent and both transmission paths of the angular gear 2450 have a transmission ratio of approximately 3 and an efficiency of 90 percent, wherein a torque of 8500 Newton meters is produced on the segment shaft 122.

Figure 3:
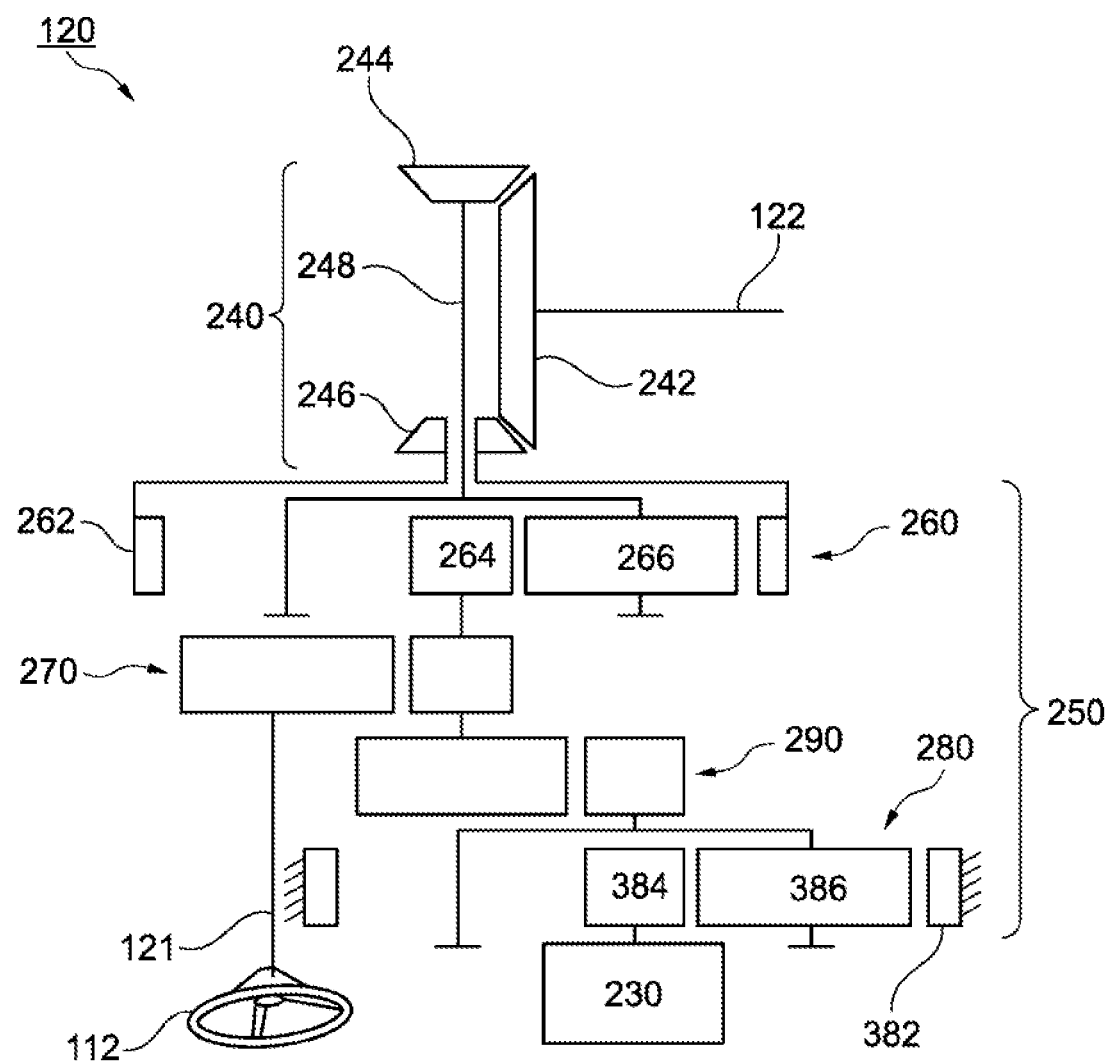
FIG. 3 is a schematic view of the steering gear of FIG. 2.

FIG. 3 shows a schematic view of the steering gear 120 of FIG. 2. In this case, the steering gear 120 shown in FIG. 3 corresponds to the steering gear of FIG. 2 with the exception that additionally the second planetary gear 280 and the second spur gear 290 are shown explicitly or in more detail.

The second planetary gear 280 has a second ring gear 382, a second sun wheel 384 and at least one second planet wheel 386. The second ring gear 382 is fixed to a housing of the steering gear 120. The second sun wheel 384 is connected to the electric motor 230. The at least one second planet wheel 386 is connected to the second spur gear 290. Thus the first spur gear 270 is connected between the second spur gear 290 and the first planetary gear 260. The second spur gear 290 is connected between the second planetary gear 280 and the first spur gear 270.

By way of example, during operation, the electric motor 230 has a torque of 20 Newton meters, by way of example the second planetary gear 280 has a transmission ratio of 5.0 and by way of example the second spur gear 290 has a transmission ratio of 2.56, wherein for example with an efficiency of 97% for the combined gears 280 and 290, a first torque of, for example, 248 Newton meters on the input side and a second torque of, for example, 1453 Newton meters and a third torque of, for example, 1695 Newton meters on the output side with, for example, an efficiency of 98% for 260 may be produced on the first planetary gear 260. Thus, on the angular gear 240, for the first transmission path a torque of, for example, 4577 Newton meters is produced on the output side and for the second transmission path a torque of, for example, 3923 Newton meters is produced on the output side with, for example, an efficiency of 90% for 240, and a cumulative total torque of, for example, 8500 Nm is produced on the segment shaft 122.

FIG. 4 shows a schematic view of the steering gear 120 of FIG. 2 or FIG. 3. In this case, the steering gear 120 is shown in an oblique view. Due to the view in FIG. 4, the input shaft 121, the segment shaft 122, the electric motor 230, also the bevel gear 242, the first pinion 244, the second pinion 246 and the intermediate axle 248 of the angular gear, also the first planetary gear 260, the first spur gear 270, the second planetary gear 280 and the second spur gear 290 of the servo gear and additionally a further input shaft 423 and a housing 424 are explicitly denoted in this case as components of the steering gear 120.

The electromechanical steering gear 120 for utility vehicles, according to the exemplary embodiment shown here, comprises the further input shaft 423 which is connected by a torsion bar to the intermediate shaft 248 of the bevel gear 240. The bevel gear 240 is connected to the output shaft or segment shaft 122 which performs a pivoting movement for the steering input onto the steering column lever and the connected articulated wheels, in particular the front wheels of the vehicle. The first planetary gear 260 and the first spur gear 270 increase a steering torque and a movement which may be introduced by the input shaft 121 which is directly connected to the steering wheel. A supporting torque, which is generated by the electric motor 230, is increased by the second planetary gear 280 and the second spur gear 290 and transmitted to the first planetary gear 260.

The steering gear 120 has by way of example dimensions which correspond to an installation space of, for example, 250 millimeters×635 millimeters×255 millimeters.

FIG. 5 shows a schematic view of the steering gear 120 of FIG. 2, FIG. 3 or FIG. 4. The steering gear 120 is shown in a plan view in FIG. 5 at right-angles or orthogonally relative to the intermediate axle 248. The view in FIG. 5 corresponds in this case to the view of FIG. 4, with the exception that in FIG. 5 the perspective is different and the segment shaft is concealed due to the view.

FIG. 6 shows a schematic view of the steering gear 120 of FIG. 2, FIG. 3, FIG. 4 or FIG. 5. The steering gear 120 is shown in FIG. 6 in a plan view at right-angles or orthogonally relative to the intermediate axle 248 and rotated by approximately 90 degrees relative to the perspective of FIG. 5. The view in FIG. 6 corresponds in this case to the view of FIG. 4 with the exception that in FIG. 6 the perspective is different and the input shaft is concealed due to the view.

Figure 7:
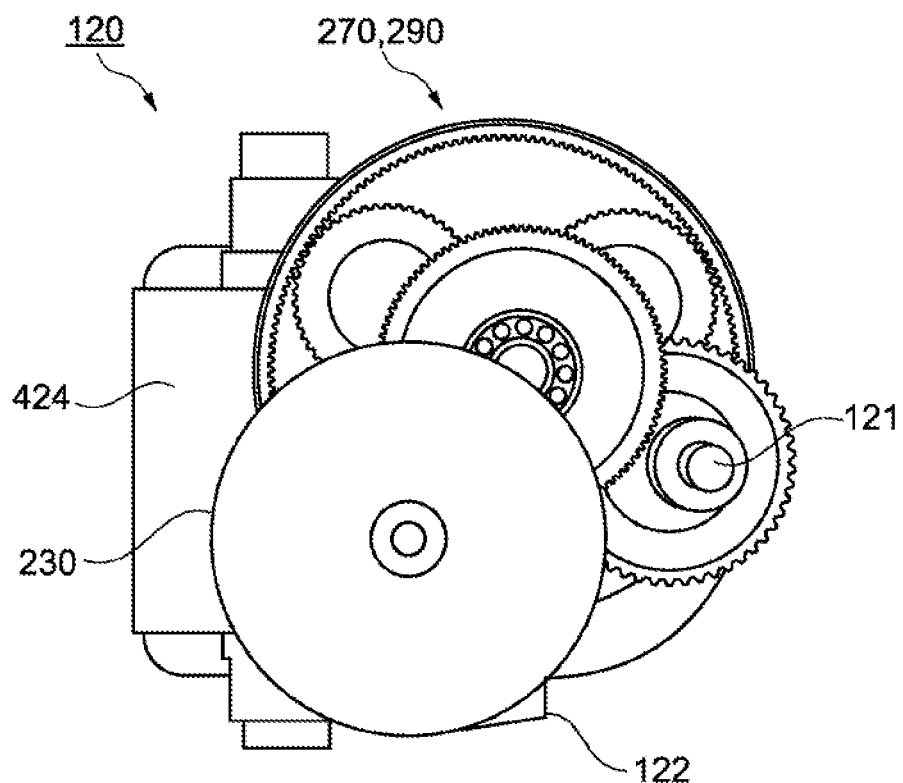
FIG. 7 is a schematic view of the steering gear of FIG. 2, FIG. 3, FIG. 4, FIG. 5 or FIG. 6.

FIG. 7 shows a schematic view of the steering gear 120 of FIG. 2, FIG. 3, FIG. 4, FIG. 5 or FIG. 6. The steering gear 120 is shown in FIG. 7 in a plan view of the electric motor 230 along the intermediate axle. The view in FIG. 7 corresponds in this case to the view of FIG. 4, FIG. 5 or FIG. 6 with the exception that in FIG. 7, due to the view, only the input shaft 121, the segment shaft 122, the electric motor 230, the first spur gear 270, the second spur gear 290 and the housing 424 are explicitly shown as components of the steering gear 120.

Figure 8:
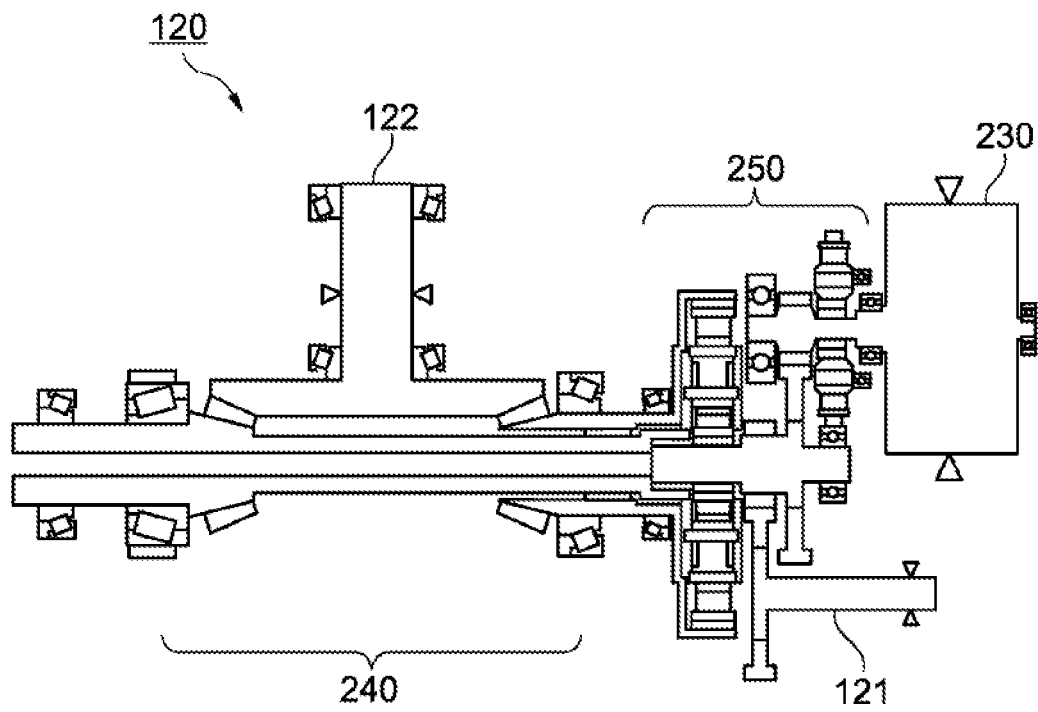
FIG. 8 is a schematic view of the steering gear of FIG. 2, FIG. 3, FIG. 4, FIG. 5, FIG. 6 or FIG. 7.

FIG. 8 shows a schematic view of the steering gear 120 of FIG. 2, FIG. 3, FIG. 4, FIG. 5, FIG. 6 or FIG. 7. The steering gear 120 is shown in FIG. 8 in a schematic partial sectional view along the intermediate axle. The view in FIG. 8 is similar or corresponds to the view of FIG. 2 or FIG. 3 with the exception that in FIG. 8, for reasons of clarity and the available space, only the input shaft 121, the segment shaft 122, the electric motor 230, the spur gear 240 and the servo gear 250 are shown as components of the steering gear 120.

The steering gear according to an exemplary embodiment or a function thereof during operation is described hereinafter in summary, and in other words once again, with reference to the above-described figures.

A steering torque which originates from a driver, is transmitted by a spur gear stage or the first spur gear 270 to a sun wheel shaft of the first planetary gear set or the first planetary gear 260 bearing the first sun wheel 264. The first planetary gear 260 is designed as a conventional epicyclic gear train with the sun wheel shaft, a carrier shaft bearing the at least one first planet wheel 266 and a ring gear shaft bearing the first ring gear 262 as well as a negative stationary transmission ratio. The first planetary gear 260 is configured to divide an input power into two separate paths: one along the planet carrier and another along the ring gear shaft. The planet carrier or the carrier shaft is connected to the intermediate shaft 248 and drives the first pinion 244 of the bevel gear set or angular gear 240. The ring gear shaft is connected to the second pinion 246 of the angular gear 240. A rotational direction of the carrier shaft opposes that of the ring gear shaft. Since a power of both the carrier shaft and the ring gear shaft of the first planetary gear 260 is negative, the torques also have different directions. Since the pinions 244 and 246 of the angular gear 240 mesh or engage on opposing sides, the power coming from both power paths or transmission paths is added to the output shaft or segment shaft 122.

The supporting torque which is generated by the electric motor 230 is increased by the second planetary gear 280 and the second spur gear 290 and transmitted to the sun wheel shaft of the first planetary gear 260 where it is superimposed on the modified steering torque. The second planetary gear 280 is designed as a conventional epicyclic gear train with a sun wheel shaft bearing the second sun wheel 384, a carrier shaft bearing the at least one second planet wheel 386, and a ring gear shaft bearing the second ring gear 382, as well as a negative stationary transmission ratio. The second ring gear 382 is fixed to the housing 484 of the steering gear 120. An input torque of an armature shaft or rotor shaft of the electric motor 230 is transmitted so as to be increased in the second planetary gear 280, according to the general laws of epicyclic gear trains, to the carrier shaft which is connected to a pinion of the following spur gear stage or the second spur gear 290. The driven wheel of the second spur gear 290 is attached to the sun wheel shaft of the first planetary gear 260. From there on, the path of the power flux is identical to that of the steering torque of the driver.

Further advantages of exemplary embodiments are that an adjustment setting of the steering ratio, for example according to customer requirements or production requirements, may be implemented in a simple manner by a corresponding design or dimensioning of the spur wheels of the spur gear 270, and that a simple implementation of a steer-by-wire steering system is provided by eliminating the steering wheel 112, input shaft 121 and first spur gear 270, and that many different embodiments or many different uses of gear types and gear combinations of the first spur gear 270, second planetary gear 280 and second spur gear 290 are possible, wherein conceivable gear variants comprise all conventional or known types, such as a belt gear, chain gear, worm gear, harmonic gear, eccentric gear, etc.

LIST OF REFERENCE NUMERALS

100 Vehicle
110 Steering system
112 Steering wheel
114 Steering column
116 Steering column lever
120 Steering gear
121 Input shaft
122 Segment shaft
230 Electric motor
240 Angular gear
242 Bevel wheel
244 First pinion
246 Second pinion
248 Intermediate axle
250 Servo gear
260 First planetary gear
262 First ring gear
264 First sun wheel
266 First planet wheel
270 First spur gear
280 Second planetary gear
290 Second spur gear
382 Second ring gear
384 Second sun wheel
386 Second planet wheel
423 Further input shaft
424 Housing

The invention claimed is:

1. A steering gear for an electromechanical steering system for a vehicle, comprising:
    an input shaft that is couplable to a steering column of the steering system;
    a segment shaft that is couplable to a steering column lever of the steering system;
    an angular gear;
    a servo gear; and
    an electric motor for driving the servo gear, wherein
    the angular gear is a bevel gear,
    the input shaft and the electric motor are connected to the servo gear,
    the servo gear is connected to the angular gear,
    the angular gear is connected to the segment shaft, and
    the angular gear is formed to transmit torque from the servo gear to the segment shaft via two transmission paths.

2. The steering gear as claimed in claim 1, wherein
    the angular gear has a bevel wheel, a first pinion and a second pinion,
    the first and second pinions are engaged with the bevel wheel,
    the first pinion is connected to a first component of the servo gear,
    the second pinion is connected to a second component of the servo gear,
    the first pinion is part of a first of the two transmission paths, and
    the second pinion is part of a second of the two transmission paths.

3. The steering gear as claimed in claim 1, wherein
    the servo gear has a first planetary gear, a first spur gear, a second planetary gear and a second spur gear,
    the input shaft is connected via the first spur gear to the first planetary gear,
    the electric motor is connected via the second planetary gear and the second spur gear to the first planetary gear, and
    the first planetary gear is connected to the angular gear.

4. The steering gear as claimed in claim 3, wherein
    the first spur gear is connected between the second spur gear and the first planetary gear, and
    the second spur gear is connected between the second planetary gear and the first spur gear.

5. The steering gear as claimed in claim 3, wherein
    the first planetary gear has a first ring gear, a first sun wheel and at least one first planet wheel,
    the first sun wheel is connected to the first and second spur gears,
    the at least one first planet wheel is connected to a first of two pinions of the angular gear, and
    the first ring gear is connected to a second of the two pinions of the angular gear.

6. The steering gear as claimed in claim 5, wherein
    the second planetary gear has a second ring gear, a second sun wheel and at least one second planet wheel,
    the second ring gear is fixed to a housing of the steering gear,
    the second sun wheel is connected to the electric motor, and
    the at least one second planet wheel is connected to the second spur gear.

7. The steering gear as claimed in claim 1, wherein
the servo gear has a spur gear stage and a planetary gear stage for transmitting the torque from the input shaft and from the electric motor to the angular gear.

8. The steering gear as claimed in claim 7, wherein
the electric motor is connected via a further planetary gear of the servo gear to the spur gear stage.

9. The steering gear as claimed in claim 1, wherein
the servo gear has a belt drive gear stage and a planetary gear stage for transmitting the torque from the input shaft and from the electric motor to the angular gear.

10. The steering gear as claimed in claim 3, wherein at least one of:
the first spur gear is a belt gear, chain gear, worm gear, harmonic gear or eccentric gear,
the second planetary gear is a belt gear, chain gear, worm gear, harmonic gear or eccentric gear, or
the second spur gear is designed as a belt gear, chain gear, worm gear, harmonic gear or eccentric gear.

11. An electromechanical steering system for a vehicle, comprising:
a steering column;
a steering column lever; and
a steering gear for the electromechanical steering system, the steering gear comprising:
an input shaft that is coupled to the steering column of the steering system;
a segment shaft that is coupled to the steering column lever of the steering system;
an angular gear;
a servo gear; and
an electric motor for driving the servo gear, wherein
the angular gear is a bevel gear,
the input shaft and the electric motor are connected to the servo gear,
the servo gear is connected to the angular gear,
the angular gear is connected to the segment shaft, and
the angular gear is formed to transmit torque from the servo gear to the segment shaft via two transmission paths,
wherein the steering column and the steering column lever are connected together via the steering gear.

* * * * *